April 19, 1938.  A. AMES, JR., ET AL  2,114,282
TESTING OPHTHALMIC LENSES
Filed Jan. 25, 1936  12 Sheets-Sheet 1

Inventors,
Adelbert Ames, Jr.,
Kenneth N. Ogle,
by Roberts, Cushman & Woodbury Attys.

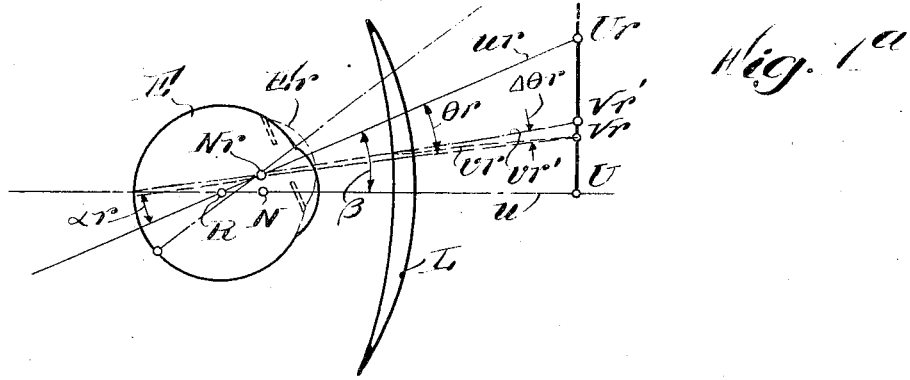
Fig. 1ᵃ
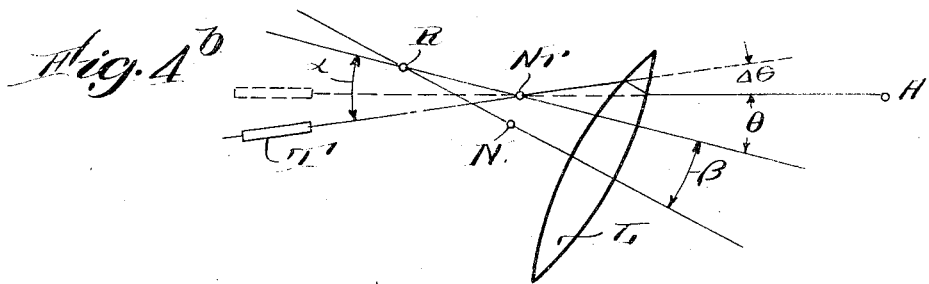
Fig. 1ᵇ
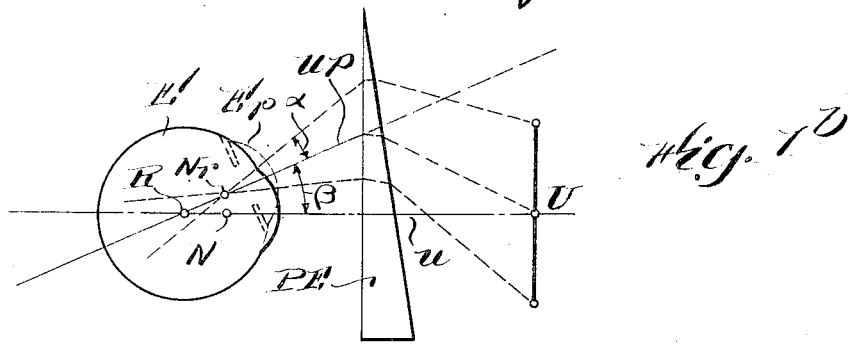
Fig. 1ᵈ
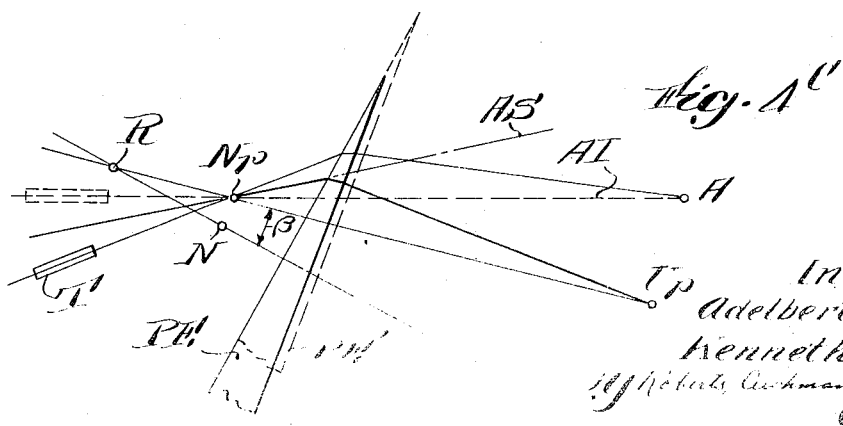
Fig. 1ᶜ
Inventors
Adelbert Ames, Jr.
Kenneth N. Ogle, April 19, 1938.  A. AMES, JR., ET AL  2,114,282
TESTING OPHTHALMIC LENSES
Filed Jan. 25, 1936   12 Sheets-Sheet 3

Inventors,
Adelbert Ames, Jr.,
Kenneth N. Ogle.
By Roberts, Cushman & Woodbury
Attys.

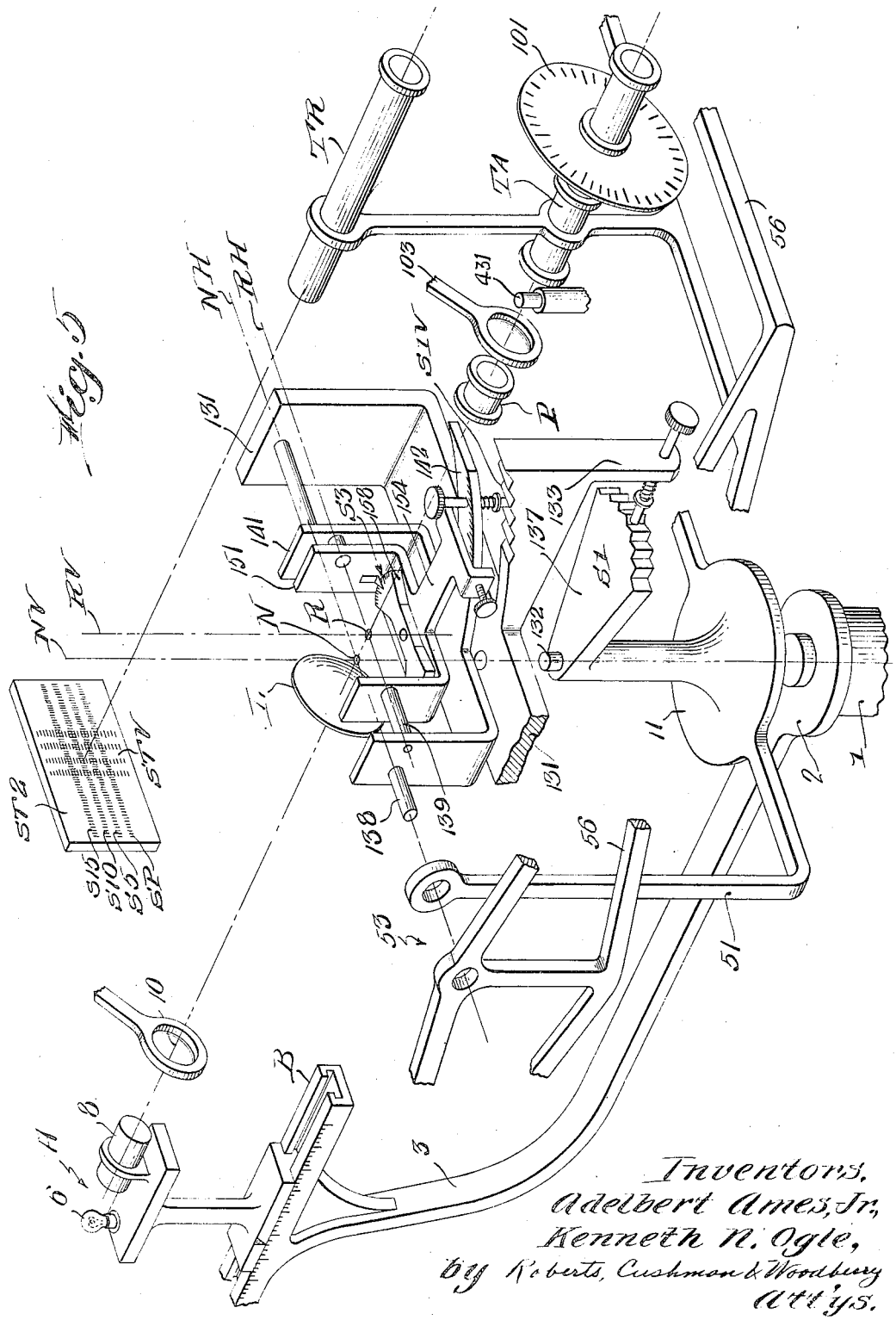

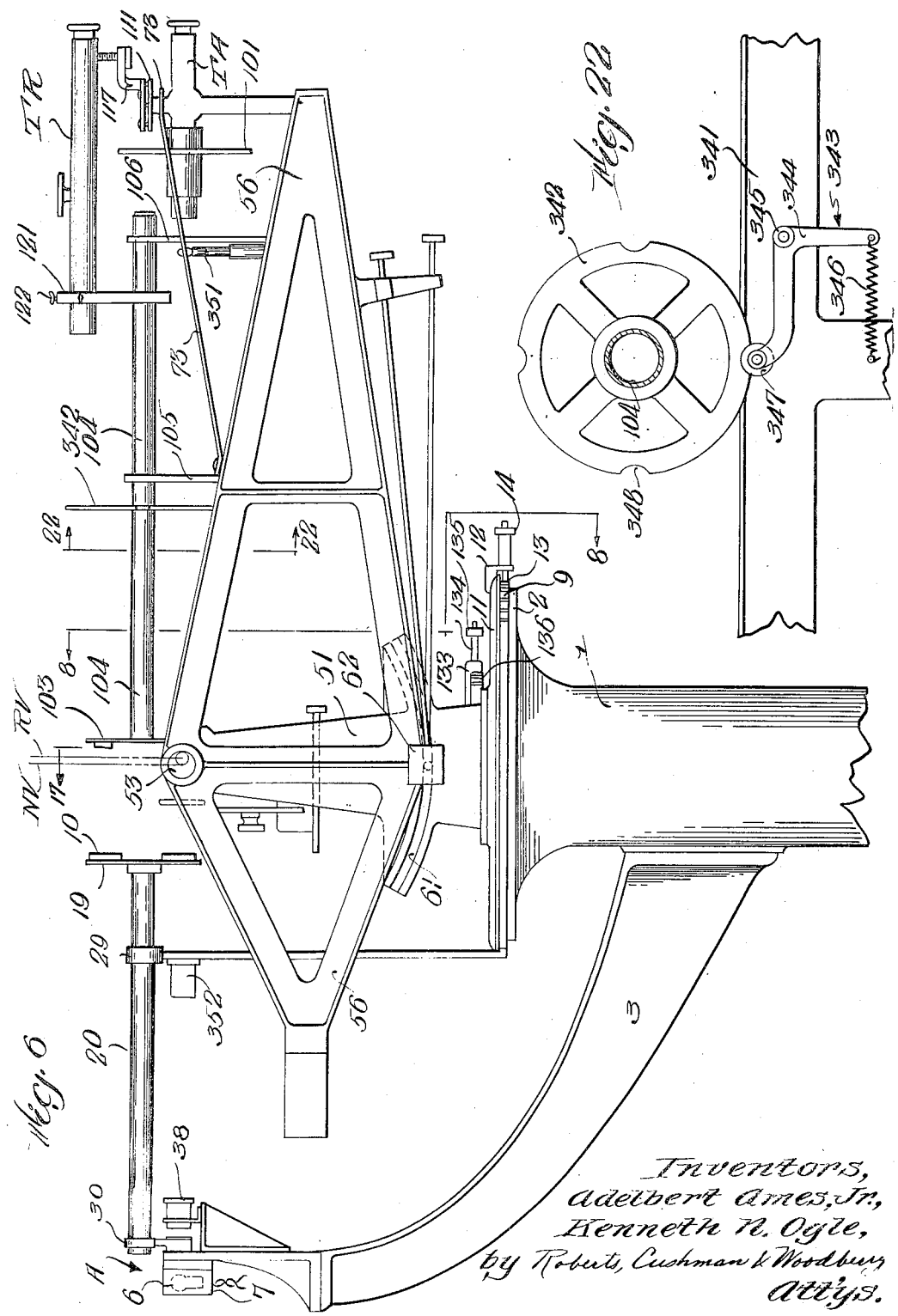

April 19, 1938.  A. AMES, JR., ET AL  2,114,282
TESTING OPHTHALMIC LENSES
Filed Jan. 25, 1936  12 Sheets-Sheet 6
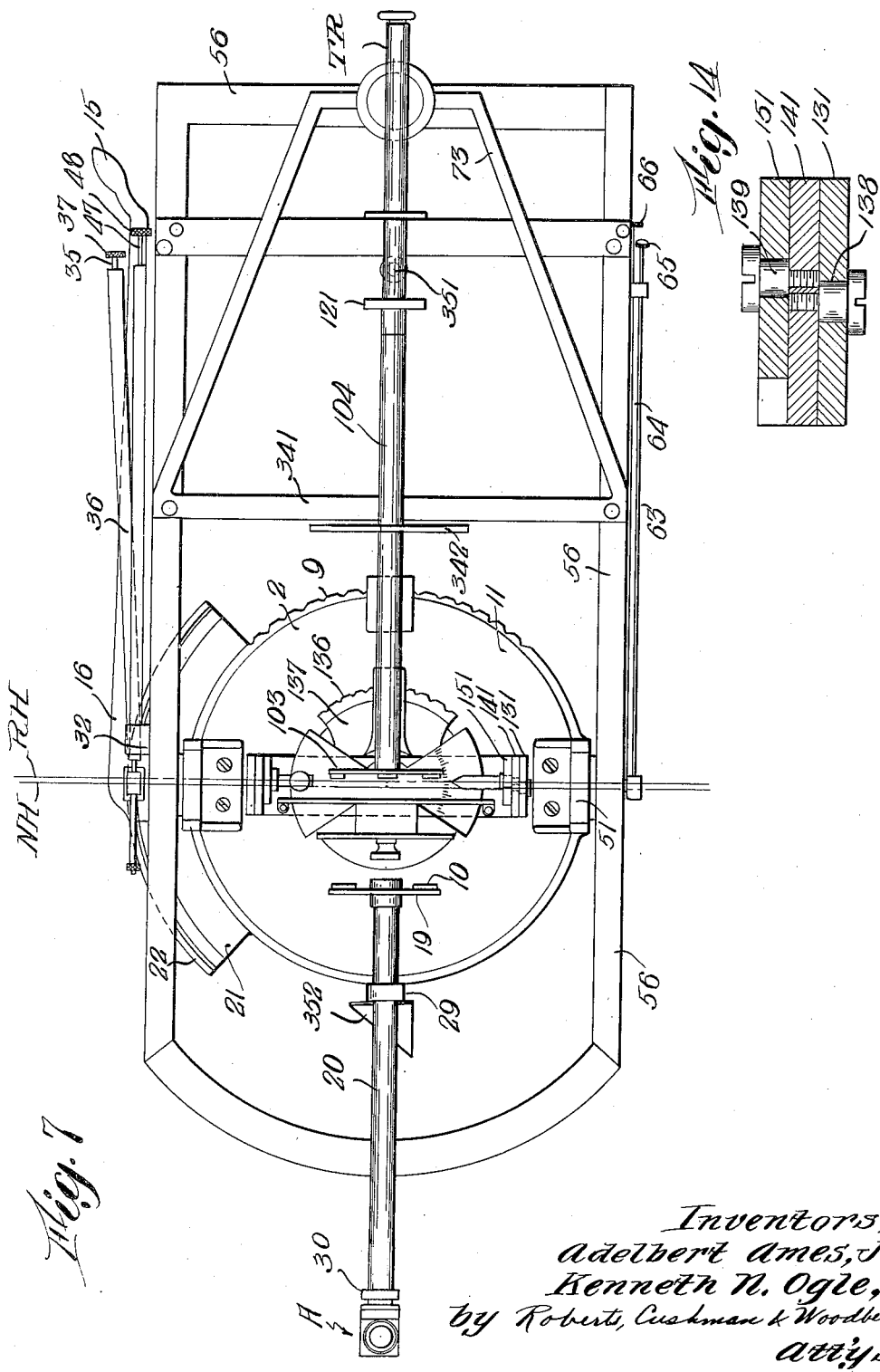
Inventors,
Adelbert Ames, Jr.,
Kenneth N. Ogle,
by Roberts, Cushman & Woodberg
attys.

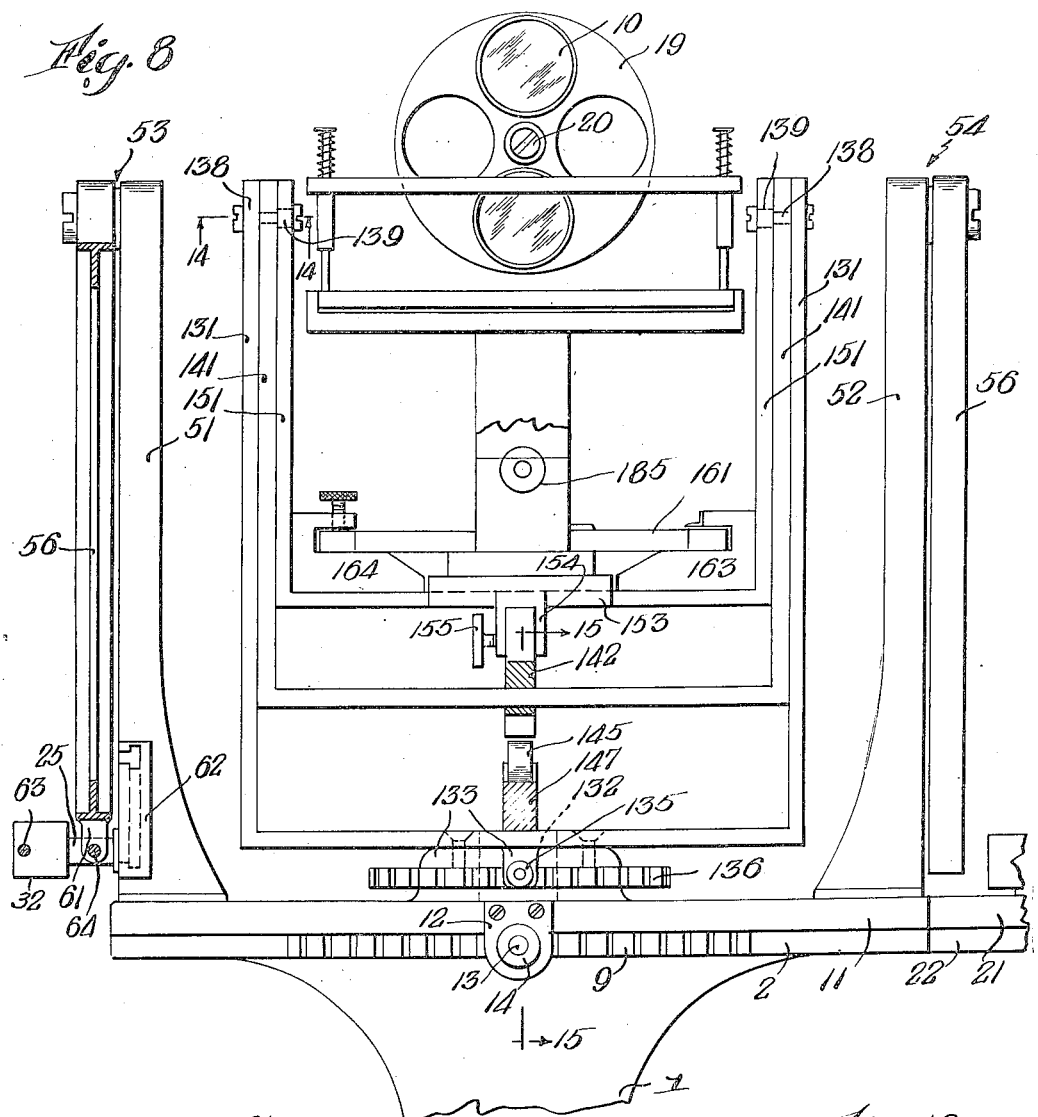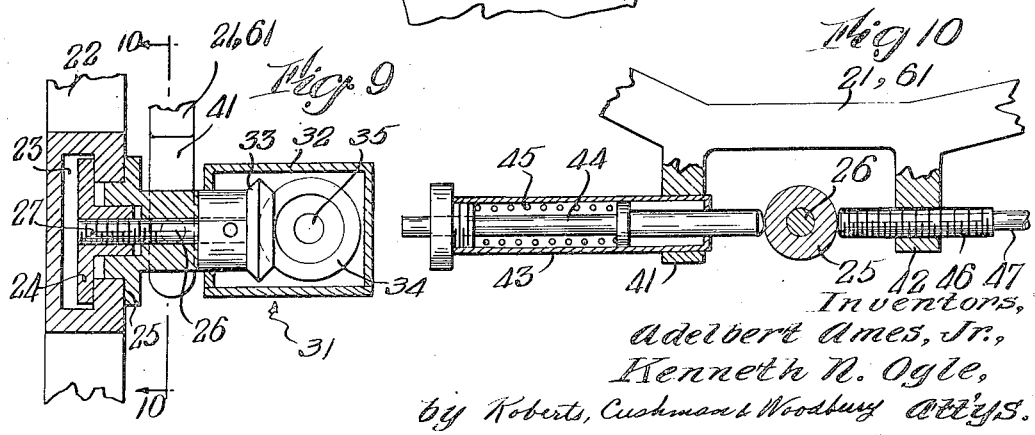

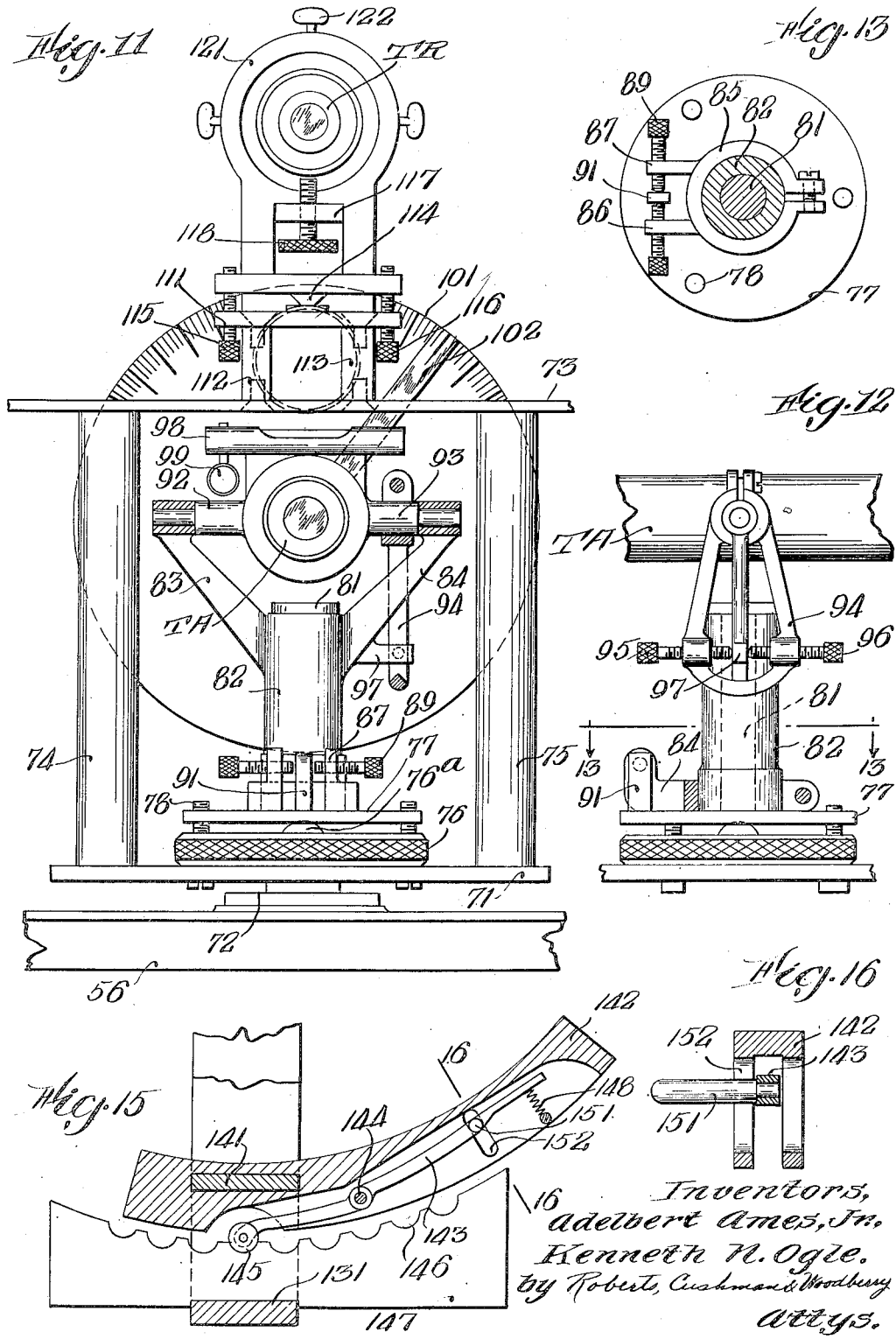

April 19, 1938.  A. AMES, JR., ET AL  2,114,282
TESTING OPHTHALMIC LENSES
Filed Jan. 25, 1936  12 Sheets-Sheet 9
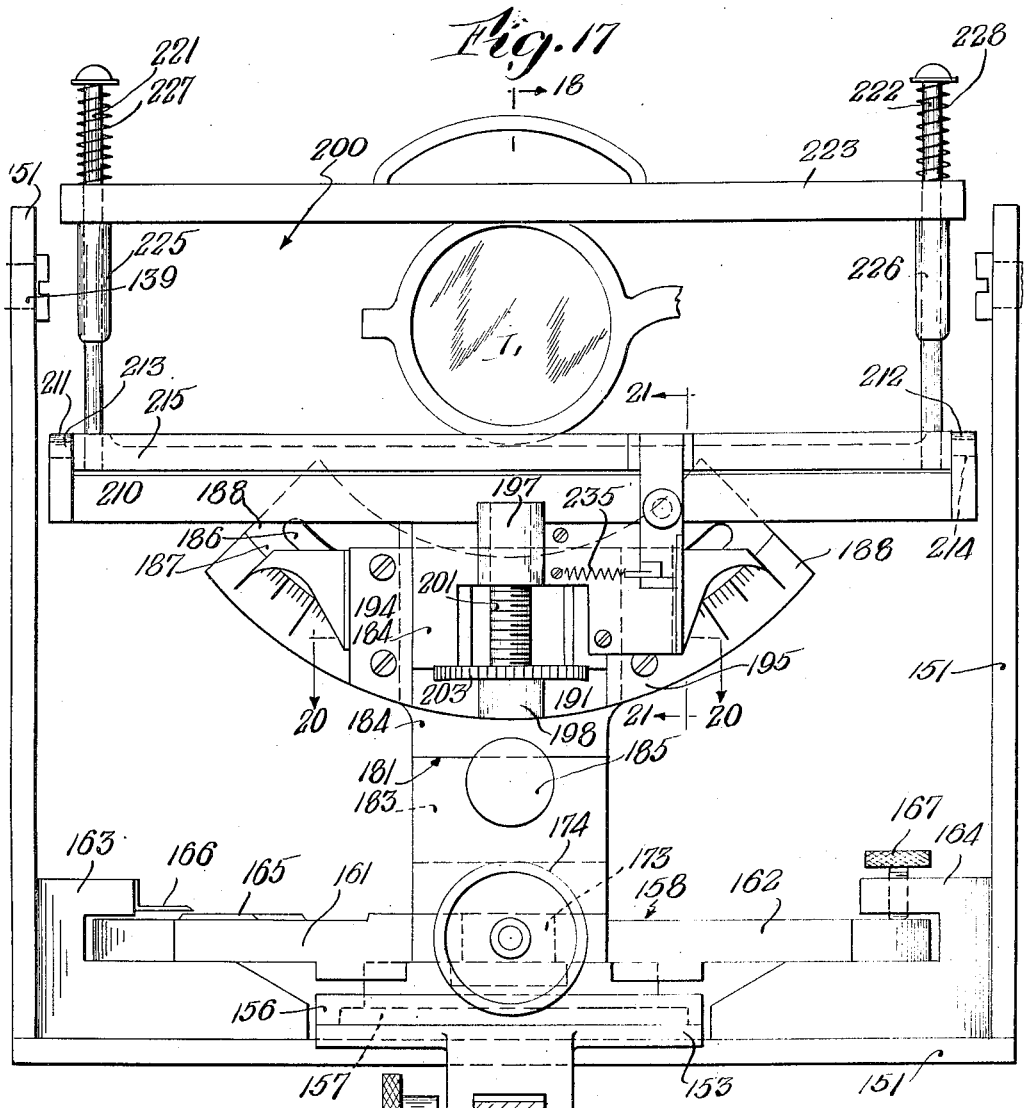
Inventors,
Adelbert Ames, Jr.,
Kenneth N. Ogle,
by Roberts, Cushman & Woodbury
attys.

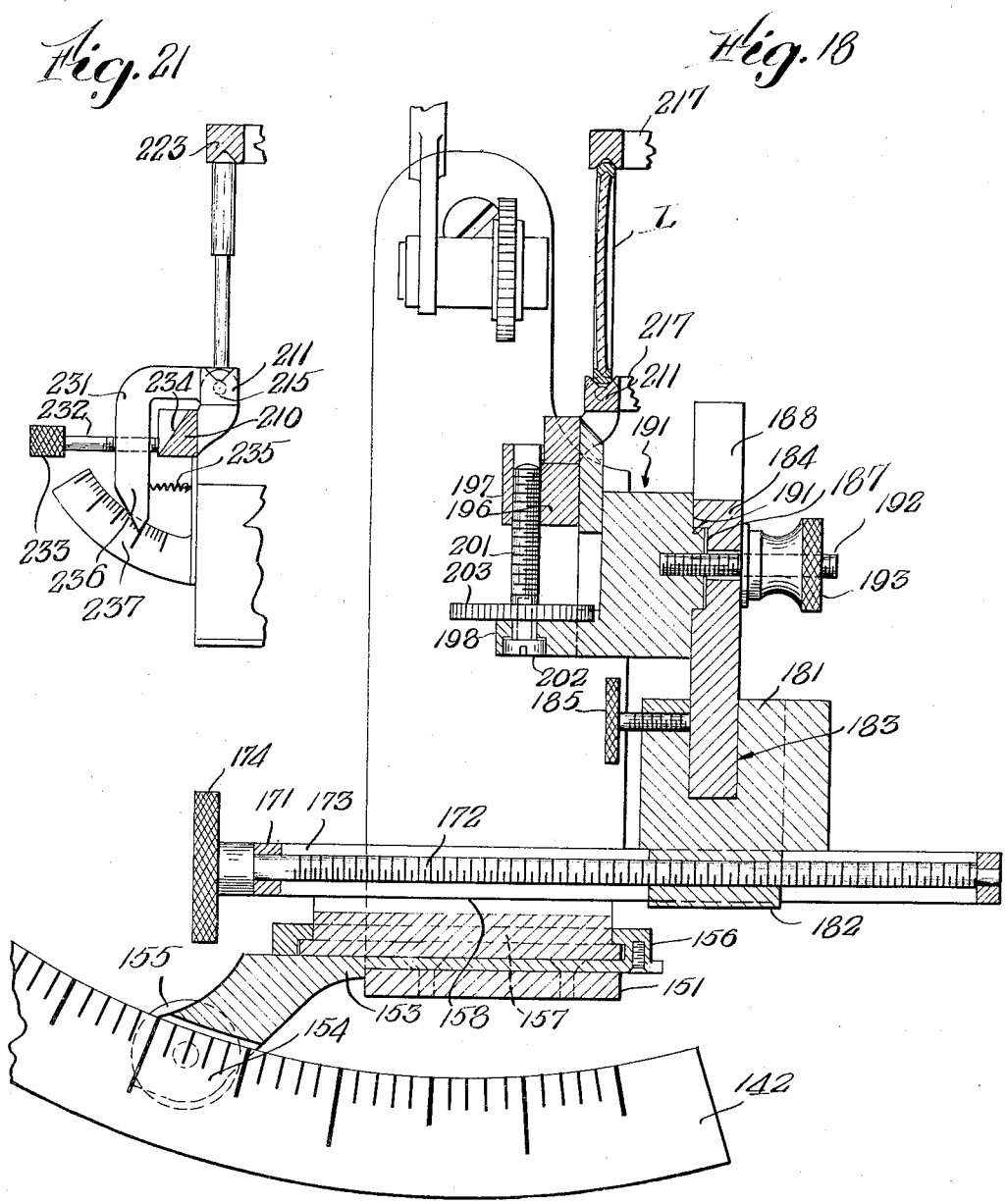

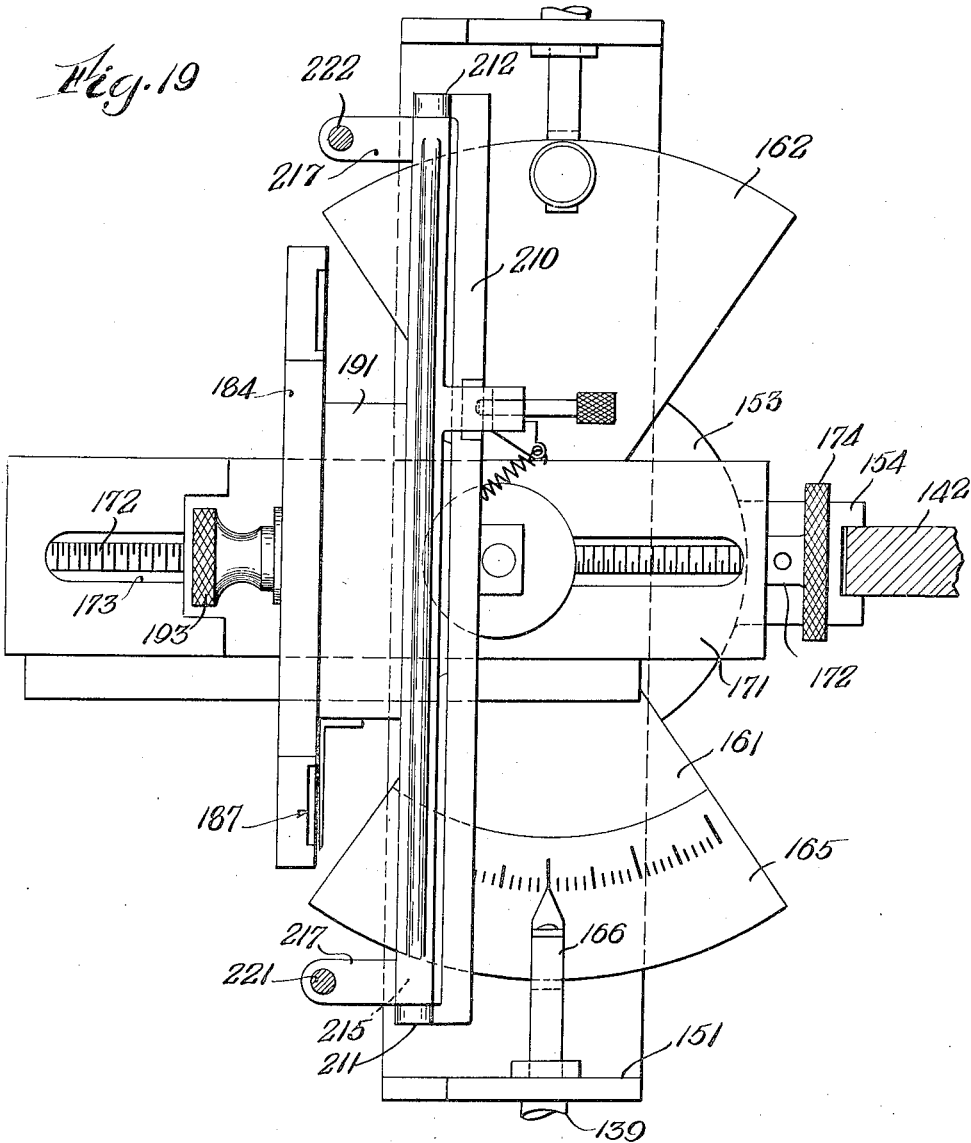

Inventors
Adelbert Ames, Jr.
Kenneth N. Ogle,
By Roberts, Cushman & Woodberry
Attys.

Patented Apr. 19, 1938

2,114,282

UNITED STATES PATENT OFFICE 2,114,282

TESTING OPHTHALMIC LENSES

Adelbert Ames, Jr., and Kenneth N. Ogle, Hanover N. H., assignors to Trustees of Dartmouth College, Hanover, N. H., a corporation of New Hampshire Application January 25, 1936, Serial No. 60,838

17 Claims. (Cl. 88—56)

It is in certain cases desirable or even necessary exactly to determine by experiment the optical effect of lenses in order to check whether or not they actually perform the functions for which they have been designed and ground. For example, lenses or lens combinations described in Patent No. 1,933,578, of November 7, 1933, to Adelbert Ames, Jr., and copending application Serial No. 750,162, filed October 26, 1934, designed from data obtained with the testing methods and instruments described for example in Patent No. 1,944,871 of January 30, 1934, to Adelbert Ames, Jr. and Gordon H. Gliddon, are often rather complex since they are to correct not only ordinary spherical and astigmatic refractory defects, but also ocular image incongruities (also called aniseikonia) and may, moreover, have prismatic components. Since the manufacture of such lenses is difficult, they will not always as a matter of fact exactly comply with the prescription and the clinical examination data; since further successful elimination of the patient's troubles depends on the exact compliance with the recommendations derived from the clinical examination as expressed in the examination data and the prescription derived therefrom, it is imperative to check the finished lenses to see whether or not they will have the desired effect on the eyes of the person who is to wear them.

The present invention has the principal object of providing a method for measuring the optical effect of a lens or lens system upon an eye, and instrumentalities for carrying out this method.

The problem here involved is quite different from that of measuring the distortion of, for example, a photographic lens. This is due to the fact that in the present case the effective displacement of the light rays, produced by lenses placed before the eye, that is at or near its anterior focus, has to be determined. There are thus introduced into the problem, among others, the complicating factors of the distance of the lens or the lenses from the nodal points of the eye, the presence of a relatively small pupil at a considerable distance from the lenses and the desirability of considering the convergence of the eyes implying varying positions of the eye relative to the lens. Moreover, many of the lenses in question have so little power that their own nodal points are usually at very considerable distances from the lenses.

As indicated above, the new method involves changes in size and shape of the optical image produced by lenses, alone or together with dioptric power effects, and not simply image distortions as that term is ordinarily used, that is, meaning a measure of the variation of magnification of the image as the light rays move away from the axis. These distortion effects in the ordinary meaning of the word are, of course, also to be measured, but the present method is primarily concerned with image magnitude changes, symmetrical to a point or a line or asymmetrical, and in addition prismatic effects. All these changes of the incident light rays will herein be referred to as "optical lens effect" or simply "effect of the lens".

In one aspect, the new method contemplates the reproduction of the optical function of the eye with and without an effective lens combined with the eye, in a manner permitting the exact comparison of the two situations and also permitting consideration of relative movement between eye and lens.

In another aspect, the new method contemplates the determination of the paths of light rays between a light source and a reference point fixed in space, with and without an interposed optical system, and the comparison between the two paths, namely the path with and the one without interposed system. The distance between reference point and optical system may be variable in order to measure different types of magnification.

In still another aspect, the new method proposes to reproduce, and to determine the optical cooperation of an eye and an eyeglass, by determining the path of only such light rays through the system eyeglass, that pass through a point of the eye which is so selected that the dioptrically effective elements of the eye can be omitted from the system.

It is also a feature of the present invention to measure the dioptric power of the lens system to be tested by focusing a telescope on a fixed light source through the lens system, or by moving the light source until it is sharply in focus, or by combining both procedures. In a preferred embodiment, the light rays used for detecting the effect of a lens system travel in the natural direction, that is from their source towards the front surface of the lens system leaving it at its ocular surface. In another embodiment, this path may be reversed, the light traveling in a direction opposite to that in which it would pass the spectacle lenses during actual use. In the first instance, the apparatus which selects a light ray, as for example a telescope which may also be used for determining the lens power, is on one side of the structure representing the eye, the light source and the lens to be tested being on the other side; in the second instance both telescope and lens to be tested are on the same side of that structure. Provisions are also made for independently focusing in both principal axes of lens systems with cylindrical elements, and for aligning, and measuring the inclinations of such axes.

The method according to our invention contemplates not only, as above mentioned, tests considering different positions of the spectacle lens relatively to the eye, but it also considers different visual distances, so that, for example, the usual reading position with the eyes looking downwardly and converging at a distance of about 40 cm. can be reproduced as well as relaxed vision with the eyes looking straight ahead at practically infinite distance.

Further features of the invention are instruments for carrying out the above-described method, which instruments provide for passing light rays through a lens to be tested and a fixed reference point, and for exactly and conveniently determining the paths of the rays as affected by various positions of the lens relatively thereto.

These and other features, objects and aspects will be apparent from the detailed explanation of the genus of the invention with reference to several concrete embodiments thereof. The description refers to drawings in which:

Figs. 1, 1ª and 1ᵇ are diagrams illustrating the principle of the invention;

Figs. 2, 3, 4, 4ª, 4ᵇ and 4ᶜ similar diagrams explaining several modifications of the invention;

Fig. 5 is a diagrammatic isometric view of an instrument especially suited for carrying out the method illustrated in Fig. 4, with the proportions of the instrument somewhat distorted in order better to demonstrate its operation;

Fig. 6 is a side elevation of the instrument schematically shown in Fig. 5;

Fig. 7 is a plan view of that instrument;

Fig. 8 is a section on lines 8—8 of Fig. 6;

Fig. 9 is a section through the adjusting mechanisms between instrument base and telescope frame;

Fig. 10 is a section on lines 10—10 of Fig. 9;

Fig. 11 is a side elevation of the telescopes and their supports, seen from the right hand sides of Figs. 6 and 7;

Fig. 12 is a side elevation of the support of the aligning telescope shown in Fig. 11;

Fig. 13 is a section on lines 13—13 of Fig. 12;

Fig. 14 is a section on lines 14—14 of Fig. 8;

Fig. 15 is a section on lines 15—15 of Fig. 8;

Fig. 16 is a section on lines 16—16 of Fig. 15;

Fig. 17 is a section on lines 17—17 of Fig. 6;

Fig. 18 is a section on lines 18—18 of Fig. 17;

Fig. 19 is a plan view of the lens support;

Fig. 20 is a section on lines 20—20 of Fig. 17;

Fig. 21 is a section on lines 21—21 of Fig. 17;

Figure 23:
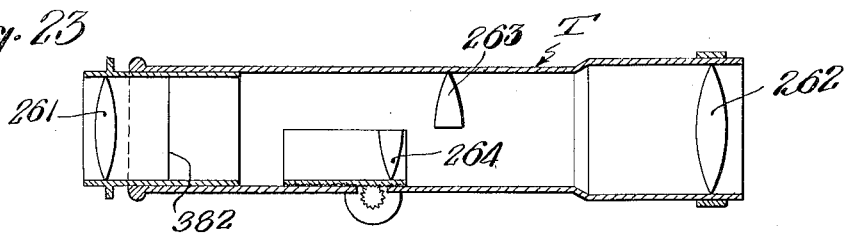
Figure 25:
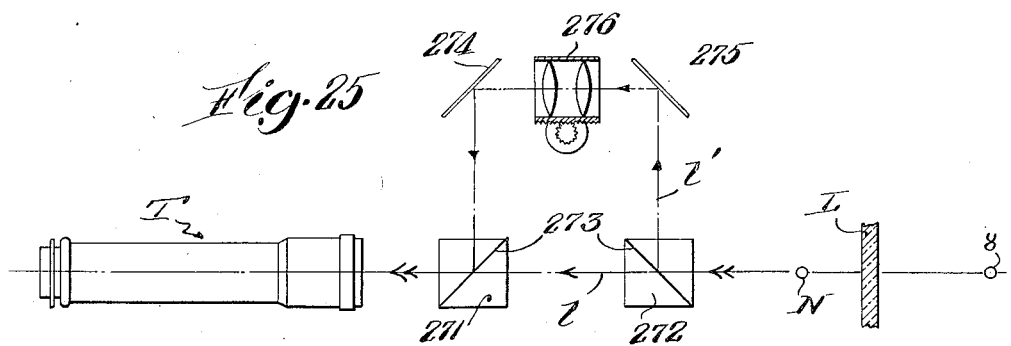
Figure 26:
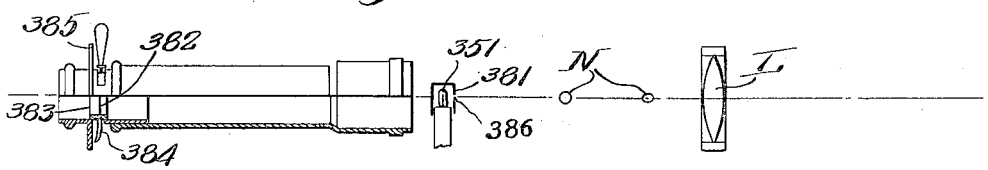
Figure 24:
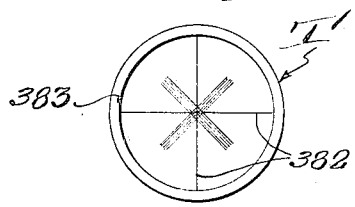

Fig. 22 an elevation of the lens adjuster shown in Fig. 6;

Figs. 23 and 25 diagrammatical representations of devices for focusing lenses with cylindrical elements; and Figs. 24 and 26 diagrams illustrating the aligning of lenses with cylindrical elements.

The principles of the invention as governed by the conditions prevailing during the correction of ocular defects with lenses placed before the eyes will first be explained with reference to Fig. 1. In this figure, E is an eye with center of rotation R, pupil P, and anterior focal plane F. As mentioned above, a reference point may be selected with a view to eliminating from the entire system the optical effect of the eye. For that purpose, and in order to obtain the total magnification effect of the lens to be tested, a pseudo nodal point N is chosen, as will be explained more in detail hereinafter. For measuring other types of magnification, different reference points may be used.

Placed with its ocular surface approximately at F is shown a lens L to be tested, of any desired shape, and schematically indicated as a plate. Assuming first that lens L is not placed before the eye, rays $u$, $v$, $w$ are principal rays from points U, V, W of a field $f$, through point N to points $U_1$, $V_1$, $W_1$ on the retina. When the lens is placed before the eye, rays to the same retinal points are deviated by lens L to positions $w'$, $v'$, coming from points V' and W' of the field. This means that, with the lens in place, points V' and W' will appear to be at the same places of the object field as points V and W seen without lens. Assuming for example that L is a curved plate with parallel surfaces, concave toward the eye, ray $w$ would be deviated as indicated in Fig. 1; that is, a field of smaller angular size would appear the same size on the retina as a larger angular field before interposition of the lens, the latter enlarging the field.

It is the aim of the present invention to measure the deviations, by a lens, of rays coming from various points of the field, or, in other words, to measure the amount of apparent displacement of points in the field caused by lenses interposed between field and eye.

This could be accomplished by placing behind the lens a number of telescopes directed at a reference point, for example pseudo nodal point N, and rotatable about that point. Such telescopes are indicated at TU, TV and TW of Fig. 1. The telescopes may be adjusted to image points U, V and W sharply on the cross hairs of the respective telescopes, with the lens to be measured not in place. If that lens is then put in its proper relation to N, the images of the previously selected object points will deviate more or less from the respective cross hairs. The amount of deviation can then be measured by determining the arc through which the telescopes must be rotated to bring points U, V, W back to the cross hairs. The relative position of eye and lens are indicated in Fig. 1, as derived from so-called "schematic eyes".

Although it would be quite feasible to employ several telescopes, for example initially placed to point in the directions of selected representative rays, say in angular distances of 5°, it is preferable to use a single telescope and to adjust the relative angular position of lens and telescope, with respect to point N. Various arrangements of this type are possible and will now be explained with reference to Figs. 2, 3 and 4.

In Fig. 2, N is again the nodal point representing an eye, and L a lens or lens system placed in proper relation to reference point N, as explained with reference to Fig. 1. Telescope T is rotatable about N. If it is desired to investigate the lens properties at a visual angle $\alpha$, the lens is placed in position as indicated, with its optical axis passing through point U of a scale S. The reading O is then taken, the lens removed, and a second reading I taken. The procedure is repeated for various angles $\alpha$, the telescope being adjusted relatively to lens and scale, for each angle.

Elementary mathematics give the magnifications as follows for $\Delta\theta$ small in comparison with $\theta$:

Angular magnification in $\% = \frac{\Delta\theta}{\theta} \times 100 =$ $$\frac{\text{Arctan } \frac{I}{D} - \text{Arctan } \frac{O}{D}}{\text{Arctan } \frac{O}{D}} \times 100$$

According to the modification schematically shown in Fig. 3, telescope T and scale S are relatively fixed, whereas lens L is movable relative thereto. It is supported in such a manner that it can be rotated about the reference point through predetermined angles α. Readings I and O without, and with lens L respectively, are again taken, and the magnifications determined as Angular magnification in $\% = \pm \frac{\Delta\theta}{\theta} \times 100 =$ $$\pm \frac{\text{Arctan}\frac{d}{D}}{\theta}, \text{ approximately} \pm \frac{d}{D\theta} \times 100$$

It will be understood that in Fig. 2, O and I are read on scale S, whereas in Fig. 3, d is read on scale S and θ on a protractor scale indicating the angular position of the lens relatively to the telescope.

Figure 4:
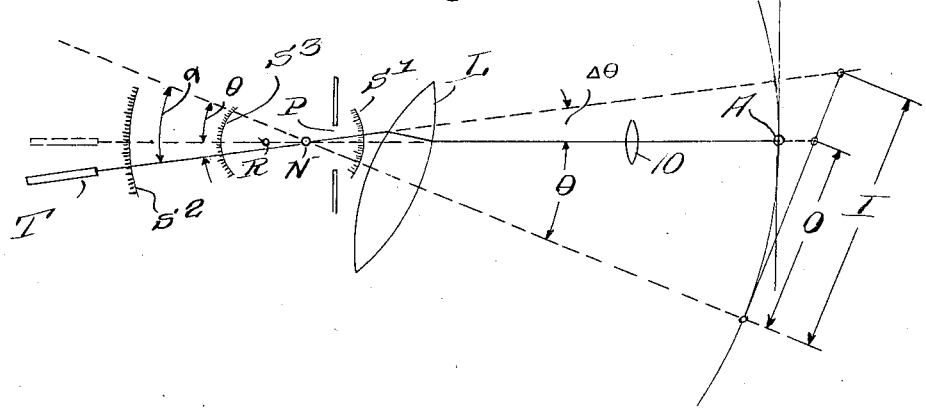
Figure 4A:
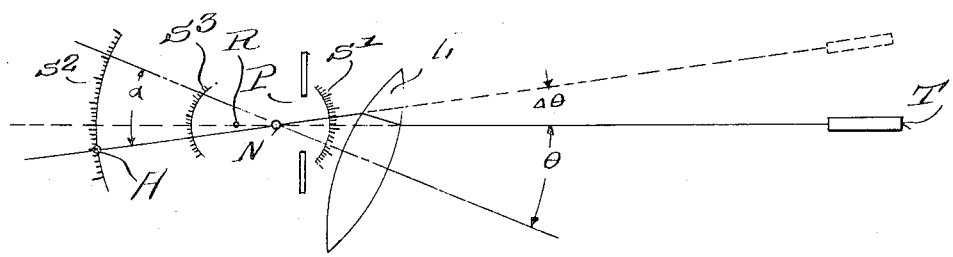

Fig. 4 shows a preferred embodiment where both lens and telescope are moved in order to derive the desired measurements. In this figure, L is again the lens to be tested, placed in a holder permitting its rotation about reference point N through predetermined angles which may be read on scale S1. Between N and the lens is placed a diaphragm providing a pupil, as indicated at P of Fig. 1. T is a telescope which, like lens L, can be rotated about point N, the amount of adjustment being read on a scale S2. A test object, preferably a point source of light, is arranged at A.

With this embodiment of our testing equipment, the new method is carried out as follows. With no lens in the lens holder, telescope T is so adjusted that scale S2 reads zero when the image of light point A falls on the cross hair of telescope T. Lens L is then inserted in normal position, that is, with its optical axis coinciding with the optical axis of the telescope. Assuming that lens L has no prism power, the image of A will remain on the cross hairs of telescope T. The lens is then rotated an angle α around N, α being the angle of the ray whose deviation is to be determined. Angle α can be derived from scale S1. If the lens deviates the light ray, point A will be displaced from the cross hair. Telescope T is then moved until this image is again back on the cross hair, the amount of adjustment being determined by means of scale S2. Similar measurements are made with the lens in various positions at determined angles both sides of the axis N—A.

The magnifications can then be determined as:

Angular magnification in $\% = \pm \frac{\Delta\theta}{\theta} \times 100$

Linear magnification in $\% = \frac{\tan[\theta + \Delta\theta] - \tan\theta}{\tan\theta} =$ $$\times 100 = \frac{\tan\Delta\theta}{\tan\theta[1 + \tan\theta \tan\Delta\theta]} \times 100$$

The testing method illustrated in Fig. 4 lends itself well to the application of various refinements of procedure and also for being carried out with the aid of an instrument which is easy to handle but nevertheless yields very accurate results. This modification will therefore be discussed more in detail, by referring to Fig. 4 and in addition to Fig. 5 which comprises all elements of Fig. 4, marked as in that figure, but shown as incorporated in a diagrammatically indicated instrument which will be described more in detail hereinafter.

It was found that the eyes note, at the axis, ocular image size differences as small as 2″ to 5″ angular magnitude, and at 5° from the axis about 30″ or 0.2% angular size difference. Hence, it should be possible accurately to read 0.1% angular deviation. This could be accomplished by means of scale S2 having a vernier or reading microscope, and being directly associated with the telescope T. It was found, however, that the procedure becomes less tedious if a reading telescope pointing at a distant scale is adopted. Fig. 5 shows aligning telescope TA which corresponds to telescope T of Fig. 4, and reading telescope TR arranged somewhat above TA and fixed thereto, so that both telescopes rotate about point N. Telescope TR points at a scale ST2 which corresponds to scale S2 of Fig. 4. Simple mathematics shows that, in order to read 0.1% deviation at an angle α of 5°, and if one inch of scale ST2 is divided into 60 parts (which can be easily distinguished), the distance between telescope TR and scale ST2 must be 4851 mm. For the same distance, 30 divisions are necessary for an angle of 10°, and 20 divisions for an angle of 15°. Accordingly, since measurements for these three angles are ordinarily sufficient, scale ST2 comprises three component scales S5, S10 and S15, shown in Fig. 5, each indicating 0.1% deviation as one division thereof, for its particular angle α.

In order to permit speedy relative adjustment of lens L and telescopes TA and TR to these selected angles of 5, 10 and 15 degrees, scale S1 of Fig. 4 is actually designed as a series of spring stops arranged at these angles, indicated at S1 of Fig. 5. Hence, if the spring stop corresponding to α=5° is used, the effect of the lens to be tested is read in 0.1% on scale S5, and similar for the other angles on either side of the axis.

Since most lenses have a prism effect, a fourth scale SP (Fig. 5) is added which indicates, in prism diopters, the prism power of a tested system for an α of zero.

It will, of course, be understood that more than three angles of any selected magnitude can be used on either side of the axis, and that an actual conventional protractor scale can be employed instead of the spring stops.

Care must be taken in order to distinguish magnifications and diminutions. Appropriate markings on scales S1 and ST2 will make this distinction easier. For example, if the sides of S1 and ST2 are marked + and − for counter-clockwise and clockwise rotation, respectively, a magnification is measured if both scales are used at the same sign, and a diminution if the signs are opposite.

Since, as will now be evident, the effect of the lens to be tested changes with the object distance, the latter must be taken into consideration. Two distances are chosen as most important; 40 cm. (16 inches) as representing ordinary reading distance and 6 m. (20 feet) as equivalent to distant vision. Accordingly, test object A is normally arranged at a distance of 40 cm., whereas the second distance is obtained by interposing a lens 10 (Figs. 4 and 5) of an optical power that causes the rays coming from source A to have the same vergence as they would have if A was at a distance of 6 m. This lens must be very accurately hinged so that it is correctly centered when swung into position. Since an intermediate object distance, for example 75 cm., is sometimes used as in the case of temporary prescriptions, provisions for measuring at that distance or at any other desirable distance may be incorporated.

Most lenses to be tested have power, both spherical and cylindrical for oblique rays, if not for paraxial rays (α small). Even a very small amount of power causes the test object A to be so far out of focus that it can not be distinctly seen nor accurately aligned. This circumstance can be met by re-focusing the telescope until it furnishes a sharp image of test object A which can then be used for the accurate magnification measurements above described. This is the only theoretically proper, and therefore preferred way, to meet the difficulty of measuring the magnification of lenses which have also power. Since the object distance may vary as above indicated, the telescope TA should have a focusing range for object distances from well within 40 cm. to beyond 20 feet. The telescope adjustment is conveniently indicated on a drumhead scale as shown at 101 of Fig. 5, which may be calibrated in various ways to be discussed hereinafter. If the object distance is changed by interposing a lens, as element 10 above described, the drum may have a double scale, as for example 40 cm. and 6 m. object distance, respectively.

The measuring of the dioptric properties of a lens, likewise an object of the present invention, will now be described.

The power of the lens to be tested can be measured by means of a focusing telescope having a focusing range, and scale means covering a long range of object distances as above described. When measuring the lens power in this manner, the object distance is fixed relatively to the reference point of the instrument. The telescope is adjusted until a sharp image is obtained, and the power read on its scale.

This way of dioptric measurement reproduces rather accurately the conditions prevailing when an ametropic eye is corrected by an ophthalmic lens. The difference between the telescope adjustments for obtaining a sharp image of the object with and without lens indicates the amount of ametropia which that lens would correct.

The telescope adjustment can be calibrated in different ways. If, with finite object distance, the power change is referred to the ocular lens surface, it is defined as the reciprocal of the image distance from that surface and called vergence power. The power may also be defined as the difference between the vergence of the light after passing the lens and its vergence before entering it, and is then usually called verging power. For infinite object distance, both vergence and verging power, referred to the ocular lens surface, become alike and are usually termed vertex power or back focal power. Instead of referring these powers to the ocular lens surface, they can also be related to any other point on the telescope axis.

By applying auxiliary lenses 103 (Fig. 5), the focal distance of telescope TA can be changed to comprise several measuring ranges within which its focus can be gradually adjusted. In this manner, a telescope of smaller range can be used to cover the entire measuring range. Disk 101 will then carry an appropriate number of scales, one for each auxiliary lens.

The most accurate way of determining power characteristics is to measure them as above described, with the aid of a focusing telescope.

Dioptric power may also be measured by changing the object distance until the image appears sharp in the telescope which, in this instance, may be a fixed focus instrument. For this purpose, object A can be put on a track B (Fig. 5) with suitable scales for measuring the object distance adjustment. An auxiliary lens 10 may again be used, and track B will then have two scales, one for reading position and one for distant vision, the first to be used without, and the second with lens 10. This method of measuring power by moving object A introduces an error since the object adjustment depends, for example when measuring vergence power, not only upon the power but also the shape (that is properties not effecting power, as cupping and thickness) of the lens. However, this error is negligible for most practical purposes.

It should be noted that, for magnification measurements, the test object, here light point A, must be placed at the correct object distance for which these measurements are to be made. For example, if measurements for reading and infinite distances are to be taken with the instrument herein described, object A will be actually placed a distance of 40 cm. from the reference point, and optically placed 6 m. from that point.

Since, as is well known, the light path through an optical system is reversible, the present method may be carried out as indicated in Fig. 4ᵃ which is identical with Fig. 4 with the only difference that the lens to be tested and the test object are at different sides of reference and pivot point N.

Apart from this reversal, the testing method is in this instance exactly the same as explained with reference to Fig. 4, as will be understood from a comparison of the two figures.

Corrective spectacle lenses are used at varying distances from the eyes, they may be tipped relatively to an eye, or decentered. In order to reproduce these conditions, the holder for the spectacle lens is preferably mounted in such a manner that the lens can be adjusted by measurable amounts to assume any of the above positions relatively to the elements representing the eye, as pupil P and pivot point N.

Since in certain cases two lenses are used in front of an eye, and since the positions of the lenses relatively to each other and to the eye may vary as above indicated, a second lens holder for a front lens may be arranged, permitting the same adjustments as the holder for the occular lens, namely variations of distance, tipping and decentering independently of, or together with, the ocular spectacle lens.

In order to bring any particular meridian of the lens to be tested into proper relation to the axes of the instrument, provisions are made for rotating the lens about the axis defined by telescope TA and point N.

So far, tests determining the lens effect on peripheral parts of the field of vision, but only with a fixed, straight ahead line of vision have been considered. Since the eyes are not always aligned with the optical axes of the spectacle lenses, especially in the instances of looking downwardly as when reading, and of corrections involving prism effects, the present invention includes measurements under such conditions. In the first instance, the eye in question looks at a point, outside of the optical axis of the corrective lens, changing its position relatively to the head by turning about its center of rotation. In the other instance, the point of attention may or may not be in the optical axes of the lens unit; at any rate, the prism effects, if any, of all types of lenses (including prisms proper and decentered lenses) involve movements about the center of rotation, are frequently of great importance and must be accurately measured for central as well as marginal portions of the lens.

In order to provide for measurements of this type, the present testing method provides relative rotation about a point corresponding to the center of rotation of the eye, as indicated in Figs. 1, 1ª and 1ᵇ and 4, 4ª, 4ᵇ and 4ᶜ.

These measurements, which constitute an important aspect of our invention, will now be described more in detail. Referring to Fig. 1ª, which is similar to Fig. 1 and has corresponding reference characters, the optical axis of lens $La$ coincides with the visual axis U of eye E in normal position. If the eye is now rotated through angle $\beta$ (for example measured on scale S3 of Fig. 4), about center of rotation R, it assumes position Er, indicated in dotted lines, and visual axis $u$ and nodal point N move into positions $ur$ and $Nr$, respectively. It is important to examine the properties of the lens in the region around axis $ur$, for various angles $\alpha r$, as above explained. The significance of rays $vr$, $vr'$, points $Ur$, $Vr$, $Vr'$, and angles $\theta r$ and $\Delta\theta r$ will be understood without further explanation by comparing Figs. 1 and 1ª, bearing in mind that center of rotation R and lens $La$ remain fixed relatively to each other whereas the visual axis with the nodal point assumes a new position relatively to the lens, and that the lens portions surrounding axis $ur$ are now to be tested as previously explained with reference to Figs. 2 to 4.

The testing instrument to be described in detail hereinafter reproduces this situation as indicated in Fig. 4ᵇ. In this figure, L is the lens rotated at angle $\beta$ about center of rotation R, with the new pseudo nodal point $Nr$ fixed in the instrument. The measurements are then taken around point $Nr$ as reference point, as described when discussing Fig. 4.

If prismatic lenses are measured, conditions are somewhat different, as follows:

Figs. 1ᵇ and 4ᶜ, which are now referred to, show a flat prism PE, but it will be understood that any lens elements having prismatic effects are intended to be represented by this flat prism. An eye E looking at a point U is again shown. When prism PE is placed in front of the eye, the latter must rotate through an angle $\beta$ in order to see point U. It assumes then position Ep, and the new visual axis $up$ determines now that region of the lens whose properties are to be measured, by means of rays subtending with $up$ angles $\alpha$ at the displaced point of reference Np.

In order to reproduce this condition in a lens testing instrument, according to Figs. 4 and 5, the prism must be rotated about a point corresponding to center of rotation R in the direction opposite to the rotation of the eye shown in Fig. 1ª. This adjustment through angle $\beta$, for example about axes RV or RH of Fig. 5, is schematically indicated in Fig. 4ᶜ. It will, however, be evident that the ray of symmetry AS coming from object A does not coincide with the axis AI of the instrument, as indicated in Fig. 4ᶜ. Also, the region of the prism around ray AS which is being examined will not be the same as that around ray $up$ of Fig. 1ᵇ. It is, therefore, necessary to shift the prism to bring that portion thereof in the measuring range whose characteristics are to be determined. This is indicated at PE' of Fig. 4ᶜ. Such a shift may increase the prism power of the lens and hence angle $\beta$ must be corrected to compensate for this change. By two such successive approximations, the properties of lens elements having prism effects can be examined under conditions at which such lenses would be used in front of an eye.

Many spectacle lenses to be tested are designed to correct astigmatic defects and also meridional eikonic defects, the meridians of astigmatism (principal meridians) and of meridional size difference (eikonic meridians) having, generally speaking, different inclinations. Hence, it may become desirable to measure a given lens in two sets of perpendicular axes, each of which may be inclined to the horizontal and vertical meridians.

For this purpose, provisions are made to carry out such measurements without removing the lens or the spectacle from its holder. The latter is mounted in such a manner that any lens can be rotated about the axis through points A and N. Provisions may further be made for measuring perpendicular meridians without rotating the lens. Accordingly, as shown in Fig. 5, the instrument may provide axes of rotation perpendicular to those shown in Fig. 4. Assuming the latter to be in a horizontal plane, they correspond to horizontal axes NH and RH of Fig. 5, whereas NV and RV are vertical axes intersecting the horizontal axes at reference point N and center of rotation R.

By setting one principal or eikonic meridian of the lens to be tested vertically or horizontally, measurements in the meridian perpendicular thereto can thus be made without resetting the lens. As shown in Fig. 5, scales S1 and S2 corresponding to S5, S10 and S15 in Fig. 5 are duplicated for rotation about a vertical axis, at STV and SIV.

By adding a rotatory adjustment of telescope T about the axis, or axes, through center of rotation R, the scales upon which magnifications are read can be set to zero by initially considering the prism power, thereby eliminating the correction for that power, as will be discussed later.

It will be understood that the various pivots must not necessarily be arranged as shown in Fig. 5, as long as the movements indicated in Fig. 4 can be carried out. For example, it will be preferable in certain instances to have two pivots through the center of rotation outside of those through the reference point, which facilitates the measuring of lens properties along oblique axes through the lens, as when reproducing the reading position or the measuring of the optical properties of prisms. In this respect, practical considerations will govern the design of the instrument, and especially whether all possible movements are provided in a large instrument of universal applicability, or whether only the essential movements are incorporated in a more compact apparatus.

Particular attention must be given to the alignment of the test object, as for example light source 8, with the cross hairs of the telescope. If the lens system to be tested has only spherical surfaces, the test object, focused as a sharp light point, can be easily aligned with the intersection of the cross hairs. If the lenses have cylindrical components and the meridian in which the measurements are carried out coincides with one of the principal meridians of astigmatic correction, accurate alignment is possible by consecutively obtaining sharply focused astigmatic lines and aligning them with the respective cross hairs of the telescope.

If, however, the meridian in which the measuring light beam swings does not coincide with one of the principal meridians, proper alignment becomes very difficult unless special provisions are made. It will be evident that any single sharply focused astigmatic line, if oblique to the cross hairs, can not be exactly aligned therewith. One way of eliminating this difficulty is to provide a rotatable cross hair piece which permits the rotation of a cross hair into the direction of any astigmatic line. Another more direct method is the following one.

Referring now to Fig. 23, T indicates the telescope tube, 261 the eyepiece and 262 the object glass. Between these elements of the telescope are mounted the two halves 263 and 264 of an additional lens, 263 being, for example, fixed to the tube and 264 adjustable along the optical axis by means of separate adjusting means, for example, a conventional rack and pinion drive. With the aid of a telescope of this type, one astigmatic line can be sharply focused with element 263 by adjusting the eyepiece, and the other line by separately adjusting element 264. The two lines will then appear as a sharply focused cross whose point of intersection can be exactly aligned with the cross hairs 382 of the telescope, as indicated in Fig. 24.

Fig. 25 illustrates another device for the same purpose. T is again the telescope, shown in its relation to reference point N and lens to be tested L. Between T and N is an arrangement of two prisms 271 and 272 with semi-reflecting light dividing surfaces 273, of a well known type, two reflectors 274, 275 and a lens system 276 therebetween. It will be evident that the light coming from object 8 is at 272 split into two portions l and l' which are again superimposed at 271. One sharp astigmatic line can be obtained by focusing beam l with the telescope, as usual, and the second line by adjusting lens system 276. The effect is the same as above described with reference to Fig. 24.

Still another possible arrangement for aligning lenses with cylindrical elements will now be understood without detailed explanation. Instead of using lens halves 263 and 264 as shown in Fig. 23, two cylindrical lenses may be introduced either instead of, or in addition to the half lenses, the axes of the cylinders forming a right angle and being aligned with the axes of the lens to be tested.

Concerning the selection of a point of reference N, we are aware of the fact that the nodal point of the optical system spectacle lens-eye is different from the nodal point of the eye alone and that the concept nodal point is correct only for paraxial rays, the nodal points for various axes forming a caustic surface. However, the effect of the spectacle lens is a change of the object space, hence the rays entering the eye can be considered as coming from a changed space, by disregarding the spectacle lens. Concerning the deviations of nodal points for other than paraxial rays, the power of the lenses to be tested is comparatively low, so that the above mentioned caustic can be replaced by a pseudo nodal point N which is the one herein referred to and whose position is indicated in Fig. 1.

It must also be considered that the eyes perceive an object field on the one hand by momentarily fixating a single prominent object, and on the other hand by slightly moving the eyes to change the center of attention. In the first instance, that is regarding each fixation object separately, the ray pencils in question pass through the pupils of the eye. Considering the change of centers of attention, the light pencils for consecutively perceived objects pass through the centers of rotation of the eyes. Since the nodal point is located approximately half way between pupil and center of rotation, it is also the best choice for a reference point if its selection is considered in this aspect.

It will now be evident that, if the pseudo nodal point is selected as reference point, the total magnification of the lens will be measured. It is, however, understood that the reference point can be shifted with respect to the lens to be tested, and that the present invention is not limited to the selection of any such point.

The diaphragm of the instrument which represents the pupil has dimensions and a distance from point N corresponding to the actual dimensions of the eye.

The instrument which is schematically shown in Fig. 5, and the lens testing method which can be carried out therewith will now be described more in detail, with reference to Figs. 5 to 22.

In these figures, l is a rigid base, preferably a standard screwed to the floor, and ending in a plate 2. Rigidly flanged to column l is an arm 3 extending laterally and supporting a point light A which may be a source of light behind a pin hole in a mask or, as in the present example, an electric bulb 6 in a housing 7, and, in front thereof, a microscope objective 8. This objective images the lamp filament as a very small star point of considerable light intensity, especially suitable for focusing it on the cross hairs of a telescope, as herein described, and constituting a test target.

In order to change the apparent distance of this test object, auxiliary lenses 10 are provided which are inserted in a disk 19 (Figs. 6, 7, 8) rotatably mounted on a rigid tube 20 fixed to standard l at 29 and 30. Suitable stops (not shown) are provided for selectively inserting one of these lenses in front of the test target.

Rotatably resting on plate 2 is arranged a standard disk 11, whose angular position relatively to the standard can be determined and fixed as follows:

Plate 2 is provided with notches 9, whereas disk 11 has an extension 12 supporting a spring plunger 13 which, if released, engages one of notches 9 and, if retracted by means of knob 14 permits relative rotation of plate 2 and disk 11. In this manner, disk 11 can be placed in selected angular positions determined by the angles of notches 9. As shown in Fig. 6, knob 14 constitutes a nut into which plunger 13 is threaded; hence, by rotating the knob, the plunger can be permanently withdrawn from engagement with the notches, leaving disk 11 free to rotate. A handle 15 on arm 16, fastened to disk 11, is provided for that purpose. In order to fix the disk relatively to the standard in any desired position, the following arrangement is made.

Plate 2 and disk 11 are provided with sectors 22 and 21, respectively (Figs. 7 and 8) which can be clamped together by means of an arrangement shown in Fig. 9. Sector 22 has a T-shaped groove 23 wherein slides a brake shoe 24 and a sleeve 25. A bolt 26 turns within sleeve 25, having at one end a thread 27 screwed into brake shoe 24, and at the other end a bevel gear 31, consisting of a housing 32 fixed to sleeve 25, a gear wheel 33 fast on bolt 26 and a second gear wheel 34 meshing with 33 and fastened to a shaft 35 extending through tube 36 to hand knob 37 conveniently arranged near handle 15 (Fig. 7). Segment 21 has two eyes 41 and 42 (Fig. 10) extending on either side of sleeve 25. Eye 41 supports a plunger housing 43 with plunger 44 and spring 45 tending to push the plunger towards sleeve 25 and confining the latter between plunger 44 and rod 46 threaded into eye 42. A shaft 47 extends to knob 48 arranged near brake knob 37 above described.

It will be evident that by turning knob 37, gears 33 and 34 and bolt 26 are rotated, the latter moving brake shoe 24 towards or against segment 22, thereby releasing disk 11 from plate 2, or firmly connecting it thereto. By rotating knob 48, bolt 46 is screwed towards or away from plunger 44, thereby moving sleeve 25 and with it disk 11.

In this manner, disk 11 and the structure supported thereon can be exactly adjusted relatively to the base, and arrested in any position independently of notch arrangement 9—13 which defines certain predetermined angles.

Two bearing standards 51 and 52 are fastened to disk 11 as shown in Figs. 6, 7 and 8. Journaled in bearings 53 and 54 is a rigid, balanced telescope frame 56. Standard 51 and frame 56 have segments 62 and 61, respectively (Figs. 6 and 8) which are equipped with a brake and adjustment device quite similar to that employed for the fine adjustment of disk 11 and shown in Figs. 9 and 10.

Brake screw and adjusting screw are controlled by shafts 63, 64 (Fig. 8) and knobs 65, 66 (Fig. 7) which, of course, move with frame 56, just as knobs 47 and 48 move with handle 15 and disk 11. In order to keep schematical Fig. 5 as simple as possible, the fine adjustment devices have been omitted therefrom.

Aligning telescope TA (compare Fig. 4) is mounted on frame 56 in the following manner (Figs. 6, 11, 12 and 13). In order to provide a rigid support for this telescope, a platform 71 is directly fastened to frame 56 at 72 (Fig. 11) and also connected thereto through brace 73 and columns 74, 75. A plate 76 with a ball support 76ᵃ rests on platform 71 and telescope flange 77 is screwed through 76 to platform 71 by means of three bolts 78 which permit tilting in any meridian of flange 77 about the apex of ball 76ᵃ.

Flange 77 extends into pin 81 surrounded by a sleeve 82 which has two telescope journal brackets 83 and 84, respectively. A collar 85 is fastened around sleeve 82 (Figs. 12 and 13) and has two prongs 86, 87 with screws 88, 89 bearing against stop 91 of plate 77. By means of this arrangement, the telescope can be adjusted about the axis defined by pin 81.

Telescope trunnions 92 and 93 rest in the journals of brackets 83, 84, mentioned above. A hoop 94 with two adjusting screws 95, 96 is fastened to trunnion 93, the two screws engaging stop 97 of sleeve 82 and permitting adjustment of the telescope about the horizontal axis defined by trunnions 92, 93. Levels 98, 99 provided for aligning the telescope with the optical axis of the instrument in a position which will be discussed later.

Telescope TA is preferably a focusing system, the movable element thereof being screwed into the fixed element and provided with a disk 101 bearing a scale on which focal distances can be read with the aid of indicator 102 fastened to the fixed part of the telescope.

The focal distance of the aligning telescope may be changed within wider ranges by means of auxiliary lenses fastened in a disk 103 rotating on a rigid tube 104 (Figs. 6 and 7) supported by cross pieces 105 and 106 of frame 56. Also fastened to disk 103 is a diaphragm constituting pupil P (Fig. 18).

Reading telescope TR is likewise associated with frame 56, as follows. Plate 111 is secured to brace 73 with two columns 112 and 113 (Fig. 11). Resting on plate 111 on a point support 114 and pressed thereagainst by screws 115, 116 is a bracket plate 117 (Figs. 6 and 11) with an adjusting screw 118 upon which rests the ocular end of telescope TR. The other end is supported in ring 121, mounted on tube 104, by four wing screws 122.

Coming now to that part of the instrument which supports the lens to be tested, a U-shaped outer yoke 131 is pivoted on a vertical pinion 132 fastened to disk 11. Attached to yoke 131 is a plunger holder 133 (Figs. 6 and 8) with plunger 134 and plunger knob 135, the plunger engaging notches 136 of a sector 137 fixed to disk 11. By means of notches 136 and plunger 134, yoke 131 can be rotated on disk 11 in the manner in which the latter is moved upon standard plate 2 by means of plunger 13 and notches 9.

Journalled in outer yoke 131 at 138 (see Figs. 8 and 14) is intermediate yoke 141, and similarly journalled, at 139, in intermediate yoke 141 but with a different axis of rotation, is inner yoke 151. The swinging movement of the three yokes relatively to one another can be regulated as follows. An arc 142 (Figs. 8, 15, and 16) is fixed to intermediate yoke 141, supporting in a slot a two armed lever 143 hinged at 144 and having at one end a roller 145 adapted to engage the notches 146 of block 147 secured to outer yoke 131. At the other end of lever 143, a spring 148 presses roller 145 downwardly. A handle 151a extends from lever 143 through window 152, permitting convenient disengagement of roller 145 from notches 146. A pivot support 153 (Figs. 8 and 16 to 19) is screwed to inner yoke 151 and extends into a clamp fork 154 straddling arc 142 and having a clamp screw 155 for arresting relative movement of intermediate yoke 141 and inner yoke 151 in journals 139.

Clamped to support 153 by means of a ring 156 is pivot 157, Fig. 18, on which turns wing plate 158. Plate 158 has two wings 161 and 162 (Figs. 17 and 19) sliding in slots of gussets 163 and 164 fitted into the corners of inner yoke 151. Wing 161 and gusset 163 are fitted with a scale 165 and indicator 166, respectively, whereas gusset 164 is provided with clamping screw 167 by means of which wing plate 158 and the structure built up thereon can be fixed relatively to the inner yoke 151.

It should be noted that, corresponding with Fig. 4, pivots 139 and the center of rotation of wing plate 158 are in the same vertical plane, namely the plane through a point corresponding to the center of rotation of the eye, whereas horizontal pivots 138, 53, 54 and the vertical axes of rotation of outer yoke 131, disk 11 and standard 1 are located in a vertical plane through a point corresponding, for example, to the nodal point of the eye. These relations are clearly indicated in Fig. 5.

Fastened to wing plate 158 is a slide carrier 171 provided with a threaded spindle 172 which can be rotated in slot 173 by means of knob 174. A slide block 181, Figs. 17, 18, has a tongue 182 extending into slot 173 (Fig. 18) and having an inner thread engaging spindle 172. By turning knob 174, the slide block can be moved along the axis of wing plate 158, and the relative position of lens L and reference point N changed within a wide range of distances between L and N.

Block 181 has a slot 183 extending at right angles to tongue 182 and wing plate slot 173, and supporting a lens holder plate 184 (Figs. 17, 18, 19). By means of screw 185, plate 184 can be adjusted at right angles to spindle 172. Plate 184 has a curved top 188 with arcuate slot 186 and arcuate guideway 187 whose centers of rotation are in the axis of telescope TA. A lens holder block 191 swings in guideway 187 and can be adjusted relatively to plate 184 by means of screw 192 fastened in block 191 and having a thumb screw 193.

Slidably fastened to block 191 by means of two rails 194, 195 (Figs. 17, 18 and 20) is lens holder slide 196 having a threaded tongue 197 aligned with boss 198 of block 191. Screw spindle 201 is mounted on boss 198 by holding screw 202 and can be rotated with the aid of thumb disk 203, moving tongue 197 up and down on block 191, along rails 194 and 195. Fastened to slide 196 and tongue 197 is lens holder or spectacle yoke 200 which is built up on bridge 210. This bridge has two journal bosses 211 and 212 extending laterally therefrom. Supported in these bosses are trunnions 213 and 214 of lower spectacle bar 215. Bar 215 has two post supports 216 and 217 (Figs. 18 and 19) from which rise posts 221 and 222. An upper spectacle bar 223 has two guide sleeves 225 and 226 engaging posts 221 and 222. Two springs 227 and 228, slipped over the posts, tend to press bar 223 downwardly. As shown in Figs. 17 and 18, a spectacle with lens L, or a lens alone can be conveniently inserted between grooved lower and upper bars 215 and 223, respectively, and securely held in position.

It will be evident that, by means of spindle 172, plate 184, block 191 and slide 196, a lens can be brought into any possible position relatively to plate 158 which rotates around the vertical axis through the center of rotation. It will be understood that for the lens holder as built up on plate 158 different designs may be adopted so long as they permit proper fixation and adjustment of the lens to be tested relatively to the main axes of the instrument.

Provisions may also be made for swinging the spectacle holder about an axis approximately tangent to its lenses. As described above, the lower bar 215 is journalled at 211 and 212. As shown in Figs. 17 and 21, an angular arm 231 is attached to bar 215. A screw 232 with knob 233 distances arm 231 from cam face 234 of bridge 210 against the force of spring 235. Arm 231 has a pointer 236 which, with scale 237, permits measured adjustment of the lens holder, about axis 211—212, by turning knob 233.

Disks 19 and 103 (Figs. 6 and 7) for auxiliary lenses and pupil may be mounted with arresting devices, as for example shown in Fig. 22. In this figure, 341 is a cross piece (shown in Fig. 7) of frame 56. 342 is a notched wheel fixed to tube 104. An arrester 343 consisting of bell crank 344 hinged at 345, spring 346 and roller 347 engages notches 348 arranged at points corresponding to aligned positions of the lenses in holder 103. It will be evident that the auxiliary lenses for focusing telescope TA can be easily brought into proper position, the opening in wheel 342 permitting free passage of light rays along the optical axis of the instrument.

It is important to check the alignment and centering of the surfaces of the lenses to be tested, especially since a large percentage thereof will have one or more toric surfaces. For this purpose, the following testing method is preferably used.

Referring to Figs. 5 and 26, an electric lamp 351 is placed in front of telescope T. This lamp is comparatively small (for example a cystoscope or ophthalmoscope lamp) and covered by an opaque shield 381 having a small pin hole 386 towards the lens in the optical axis.

Lamp and shield being very small, they do not appreciably interfere with the operation of the telescope. Preferably they can be lowered to be out of the way after having served their purpose. When a lens L is placed beyond reference point N. as indicated, and lamp 351 turned on, each of the surfaces of the lens acts as a mirror and forms an image of the point source of light. The telescope can then be focused on these images, their positions indicating the relative position of the centers of the surfaces. The lens may then be tipped or rotated and adjusted so that both the images fall on the cross hairs of the telescope, provided, of course, that the lens has no prismatic effect. If the surfaces of the lens are torics, two images of the point source of light are derived from the two principal meridians of each surface. These images are, of course, the astigmatic lines. In a given doublet lens it is easy to detect whether or not these lines are parallel for the same meridian of the lens.

It is easy to check by this method whether the axes of the torics coincide with the principal meridians of the lens. This or a similar device can also be used with appropriate scales on the lens holder (for example, on disk 188 of Fig. 17) to measure the difference between the axes of the two toric surfaces of a bitoric lens with crossed cylinders.

As mentioned above when referring to Figs. 23 to 25, the cross hairs of the telescope can be arranged for rotation about the optical axis of the telescope. Such an arrangement is indicated in Fig. 26 where 382 is a cross hair, 383 its rotatable holder, 384 an indicator attached to 383, and 385 a scale on which the amount of rotation can be read by means of the indicator. By apparently superimposing the cross hair on the various reflected linear images of the pin hole in cover 381, and reading the respective cross hair positions, the angles between the toric axes can be determined. In order to make this measurement more accurate, the lens may be turned over and the readings repeated.

The method of testing spectacle lenses according to the present invention by using the above described modification of the testing instrument will now be described.

Assuming that the total magnification is to be measured, the lens to be tested, alone or in its frame, is placed in the spectacle holder and adjusted relatively to pupil P (see Figs. 5 and 18) and pivot N substantially at the position in which it will be worn before the eyes with scale S1 in zero position. This is accomplished by the movements above wing plate 158, as will be evident without further explanation. If necessary, the lens is tipped or decentered. The meridians to be measured are positioned vertically and horizontally, through axes NV, RV and NH, RH, respectively. If the astigmatic meridians are measured, their position can be determined, as previously described, with the use of the telescope and scale 101.

The dioptric power both of the test image and the primary and secondary astigmatic images are then measured as above described, by focusing with telescope TA, or by moving object A until it appears sharpest, or by combining both procedures, also using the auxiliary lenses for different object distances. If there is prism power it is read on scale SP and also on scales S5, S10 and S15, the latter readings to be added or subtracted from the actual readings at the corresponding angles α, in order to obtain the actual deviations.

Lens L is then turned to assume the various angles α defined by the notches constituting scale S1, object A is for each α aligned in telescope TA, and the respective scale ST2 read with telescope TR, in order to obtain the deviations as explained with reference to Fig. 4. These data are recorded when the apparatus is focused for the best image as well as when primary and secondary images are in focus. If no prism power was indicated with the lens in position for an α of zero, these figures give the effective deviation. If a prism power is present, the respective readings for each scale are subtracted, as mentioned above. For each α, power readings are made for the best image and the primary and secondary images, as above described.

The same procedure is repeated for the vertical meridians, turning the lens about axis NH. If measurements for oblique vision are to be made, the angle of vision is introduced by rotating the lens about RV and RH, respectively, and the procedure repeated as above described.

It should be understood that the present disclosure is for the purpose of illustration only and that this invention includes all modifications and equivalents which fall within the scope of the appended claims.

I claim:

1. A device for testing lenses comprising a support, mounted on said support a diaphragm representing the pupil of an eye, a source emitting a ray of light passing through said pupil, means on said support for holding a lens to be tested on one side of said diaphragm for rotation about a point on the other side of said diaphragm at a distance therefrom approximately equal to the distance between pupil and pseudo nodal point of the human eyes, means mounted on said support on the side of said point, for aligning said source and said point through said lens and said diaphragm, and means for measuring the angular positions of the axis of said lens and of said aligning means.

2. A device for testing lenses comprising a support, mounted thereon a pivot means defining an axis of rotation, a test object in definite relation to said axis, optical means rotatable on said support about said pivot axis for defining the direction of a pencil of light rays from said object, substantially perpendicular to said pivot axis, means for changing the distance from said axis of said object as appearing in said optical means, means mounted on said support rotatable about said axis for holding a lens to be tested in the path of said pencil at a certain distance from said axis, and means for determining the angular positions relatively to said axis of said object, said optical means and said holding means.

3. In a device for testing lenses, a support, a pivot point on said support, on one side of said point a test object in definite relation to said support, means on said support for holding a lens to be tested at predetermined angular positions relatively to said point, and at a predetermined distance therefrom, and on the other side of said point a telescope mounted on said support rotatably about said point, means for focusing said telescope on said object, scale means for indicating the relative positions of said object and said telescope, and means for indicating the optical distance from said point of the object focused with said telescope, whereby said telescope can be aligned with said object as seen through said lens at various positions thereof, the apparent deviation of said source effected by said lens with respect to said point being indicated on said scale means, and the power of said lens at said positions being read on said indicating means.

4. A device for testing lenses comprising a support, a light source definitely located in relation to a point of reference on said support, means for determining the undeviated path of a ray from said source through said point, means on said support for placing a lens to be tested into said path and for adjusting the position of said lens relatively to said point as to angular position and distance in two perpendicular meridians, and means for determining the paths of said ray as deviated in said meridians by said lens at a measured position.

5. A device for testing lenses comprising a support, mounted on said support an aligning telescope rotatably adjustable about two pivot axes perpendicular to each other, a light source fixed relatively to said support on the other side of said axes and optically aligned with said telescope and the point of intersection of said axes, means on said support for holding a lens to be tested between said source and said axes and for rotating it about said axes, means for aligning predetermined meridians of said lens with the planes defined by said telescope and said axes, a reading telescope on said support parallel to said aligning telescope, and a two dimensional scale fixed relatively to said source, said aligning telescope defining a light ray from said source through both axes deviated by said lens rotated in predetermined positions about said axes, and said reading telescope defining a straight line corresponding to the undeviated light ray, deviations of said ray in said meridians being indicated by readings on said scale.

6. A device for testing lenses comprising a support, a test object definitely located with respect to said support, means for determining an axis through said test object and a point of reference, means on said support for inserting a lens to be tested in said axis and for measurably adjusting the position of said lens relatively to a second point of reference, means for adjusting said lens and said second point of reference relatively to said first point of reference, and means for determining the deviation by said lens of a light ray from said object through said lens and said first point of reference.

7. A device for testing lenses comprising a support, a test object definitely located with respect to said support, a pivot point on said support, holding means on said support for adjustably positioning a lens to be tested relatively to said point, a second pivot point intermediate said support and said first pivot point, means for adjustably positioning said lens and said first pivot point relatively to the second pivot point, aligning means for determining the path of a light ray from said object through said lens and through said first point, means for rotatably adjusting said object and said aligning means about one of said points, and means for measuring the relative positions of said object and said aligning means at various positions of said lens, the relative positions of said two points and said lens being substantially those of a magnification reference point of an eye, the center of rotation of the eye, and a spectacle lens before the eye, respectively.

8. The method of testing the effect of a spectacle lens upon the image on the retina, comprising tracing an undeviated light ray through a fixed point, placing said lens coaxially with said ray at a predetermined distance from said fixed point, relatively rotating said lens and said ray about said point, and measuring the difference of corresponding deviated and undeviated rays for various angular relations between said lens and said ray.

9. The method of testing the effect of a spectacle lens upon the image on the retina, comprising aligning a fixed reference point and a fixed rotation point with a light ray coming from said reference point, placing the lens to be tested in position relatively to said rotation point substantially similar to its position to the pseudo nodal point of the eye before which it is to be used as a spectacle lens, deviating said light ray with said lens at various angular positions thereof relatively to said rotation point and measuring in each position the deviation of said reference point as observed through said light ray.

10. The method of testing the effect of a spectacle lens upon the image on the retina of an eye, which comprises sending a light ray from a test object point through a reference point, placing the lens to be tested in effective position relatively to said reference point substantially similar to its position relatively to a selected point of the eye before which it is to be placed as spectacle lens, rotating said lens and said ray relatively to each other about said reference point into test positions for oblique rays without otherwise changing said effective position and measuring for said test positions the deviations of said ray.

11. The method of testing the effect of a spectacle lens upon the image on the retina of an eye, which comprises sending a light ray from a test object point through a reference point, placing the lens to be tested in effective position relatively to said reference point substantially similar to its position relatively to the pseudo nodal point of the eye before which it is to be placed as spectacle lens, turning the lens about said reference point into a test position for which said ray corresponds to an oblique ray through said reference point, rotating the lens about a point positioned with respect to said reference point as the center of rotation of the eye, without otherwise changing said effective position, and measuring for said test position the deviations of said ray.

12. A device for testing lenses comprising a support, a point source of light definitely located with respect to said support, a telescope mounted on said support, means for rotatably adjusting said telescope about an axis of reference substantially perpendicular to its optical axis, a lens holder mounted on said support for rotation about said axis, means for adjusting the distance of said lens holder from said axis, and means for determining angles subtended by lines through said source and said axis of reference, and said optical axis.

13. A device for testing lenses comprising a support, a test object definitely located relatively to said support, means, mounted on said support, for determining an axis through said test object and a point of reference, means mounted on said support for inserting a lens to be tested in said axis, means for rotatably adjusting the position of said lens relatively to said point, and means for determining the deviation by said lens of a light ray from said object through said lens and said point of reference.

14. A device for testing lenses comprising a support, an aligning telescope rotatably adjustable about an axis defined on said support perpendicular to the optical axis of said telescope, a light source fixed on the other side of said axis, means on said support for holding a lens to be tested between said source and said axis, means for adjusting the distance from the lens to the axis and for rotating the lens about the axis, a reading telescope mounted parallel to said aligning telescope and aligned through said axis, and a scale fixed relatively to said source, for observation with said reading telescope, said aligning telescope defining a light ray from said source through said axis and deviated by said lens fixed in predetermined positions by said holding means, and said reading telescope defining a straight line corresponding to the undeviated light ray, deviations of said ray from said line being indicated by readings on said scale.

15. A device for testing lenses comprising a support, a light point definitely located with respect to said support, a telescope mounted on said support, means for rotatably adjusting said telescope about an axis of reference substantially perpendicular to its optical axis, a lens holder mounted on said support for rotation about said axis, means for adjusting the distance of said lens holder from said axis, means for rotating said lens holder about an axis substantially parallel to the optical axis of said telescope, and means for determining the angles subtended by lines through said source and said axis of reference, and said optical axis.

16. The method of measuring the effect of the entire area of an ophthalmic lens with respect to a selected reference point, comprising placing the lens in a testing instrument defining a single linear light ray with said ray penetrating the lens, rotating the lens into various measuring positions with its optical axis intersecting said ray at a predetermined variable point constituting said reference point, and measuring in each position the angle between the undeviated and deviated directions of said ray.

17. The method of measuring the effect of the entire area of an ophthalmic lens with respect to a selected reference point, comprising placing the lens in a testing instrument defining two single linear light rays one a control ray and the other an operating ray, with said operating ray penetrating the lens, rotating the lens into various measuring positions with its optical axis intersecting said operating ray at a predetermined variable point constituting said reference point, and measuring in each position the angle between the deviated operating ray and the control ray.

ADELBERT AMES, JR.
KENNETH N. OGLE.